United States Patent

Aumann, III et al.

[15] 3,670,311

[45] June 13, 1972

[54] DATA PROCESSOR CONSOLE COMMUNICATIONS SYSTEM

[72] Inventors: Frederick C. Aumann, III, Chelmsford, Mass.; Gerald V. Butler, Jr., Whittier, Calif.

[73] Assignee: Digital Equipment Corporation, Maynard, Mass.

[22] Filed: Nov. 19, 1970

[21] Appl. No.: 91,132

[52] U.S. Cl. ....................................... 340/172.5, 340/147 R

[51] Int. Cl. ....................................... G06f 3/14, H04q 11/00

[58] Field of Search ................340/172.5, 147, 151, 152, 163

[56] References Cited

UNITED STATES PATENTS 3,544,971 12/1970 Looschen ..........................340/172.5
3,548,384 12/1970 Barton et al. .......................340/172.5
3,351,912 11/1967 Collom et al. ......................340/172.5
3,581,289 5/1971 Wilhelm et al......................340/172.5
3,573,445 4/1971 Korytnaja et al. ..................340/172.5
3,387,269 6/1968 Hernan et al...................340/152 R X
3,401,385 9/1968 Jaffe..............................340/152 R X

*Primary Examiner*—Paul J. Henon
*Assistant Examiner*—Ronald F. Chapuran
*Attorney*—Cesari and McKenna

[57] ABSTRACT

A data processing system which multiplexes signals between the central processing unit and a console unit over a single set of conductors. Sets of indicating lamps and switches in the console unit correspond to storage units in the central processor unit. Selector circuits respond to recurring sequential gating signals to connect each storage unit to its corresponding row of switches or indicating lamps repeatedly in sequence over the conductors. Persistence causes the lamps to continuously display the contents of the corresponding storage units while the switches alter the contents in the storage units intermittently connected to them.

11 Claims, 6 Drawing Figures

INVENTORS
FREDERICK C. AUMANN
GERALD V. BUTLER, Jr.
BY Cesari and McKenna
ATTORNEYS

DATA PROCESSOR CONSOLE COMMUNICATIONS SYSTEM

BACKGROUND OF THE INVENTION

This invention generally relates to data processing systems and more specifically to a transfer of signals between a central processor unit and an operator's console unit.

A data processing system normally includes a central processor unit with an arithmetic element, a random access memory element and an input/output element. Each of these elements, in turn, may comprise one or more storage locations or registers for retaining digital information. A given register usually has several related or unrelated bits with each bit being stored in an individual stage. The content of a program counter (i.e., an address in the random access memory element) is an example of related bits, while the contents of each stage in a register representing various internal conditions such as "running" and "stopped" are unrelated control bits which may be arbitrarily grouped in a register.

The console unit enables an operator to control the system manually, to correct errors, to determine the status of various machine circuits, registers and counters, to determine contents of a particular register or random access memory location and to revise the contents of a register or storage location. It usually comprises one or more sets of display lamps for indicating the contents of the various registers and one or more sets of switches for generating the information which identifies registers, alters the contents of an identified register and performs other control functions.

For example, if an operator wants to revise the contents of a specific location in the random access memory unit manually, he sets appropriate data, addressing and control switches. When the central processor unit processes information in response to control the signals, it transfers the contents of the data switches to one register and the contents of the address switches to another register. Then the central processor unit moves the data to the addressed location.

Normally, the switches are arranged in sets, and a separate cable couples each switch set to an input register in the central processor unit. Similarly, the display lamps are arranged in sets and a separate cable usually couples each set of display lamps to the central processor unit. Another cable couples other signals and power from the central processor unit to the console unit. As a result, the console unit and central processor are connected by a number of separate cables.

These cables pose several problems. During the manufacture or installation of a system, each cable, which may comprise any number of conductors, must be connected to the central processor unit and to the console unit. If the console unit is subsequently moved, it may be necessary to reroute the cable. This requires each conductor at one end, at least, to be disconnected and then reconnected. Furthermore, in some cases the relocation requires a longer cable so the entire set of cables must be replaced. The process for connecting cables is tedious and time-consuming, and the cables themselves are costly. Therefore, the costs associated with the initial installation or subsequent relocation of each cable can constitute a significant part of both the installation and material costs.

Therefore, it is an object of this invention to reduce the complexity of connecting a central processor unit and a console unit.

It is another object of this invention to reduce the number of conductors required for interconnecting a central processor unit and console unit.

SUMMARY

In accordance with our invention, a single set of conductors arranged in a cable couples a central processor unit and the console unit. A sequencing circuit couples appropriate registers to corresponding sets of display lamps or switches to corresponding registers over the single set of conductors in a recurring sequence. In this manner, the system multiplexes signals onto a single cable and significantly reduces the number of cables. Specifically, the system requires only a single cable with one conductor for each stage in the largest register.

This invention is pointed out with particularity in the appended claims. A more thorough understanding of the above and further objects and advantages of this invention may be attained by referring to the following description taken in conjunction with the accompany drawings.

DESCRIPTION OF AN ILLUSTRATIVE EMBODIMENT

Figure 1:
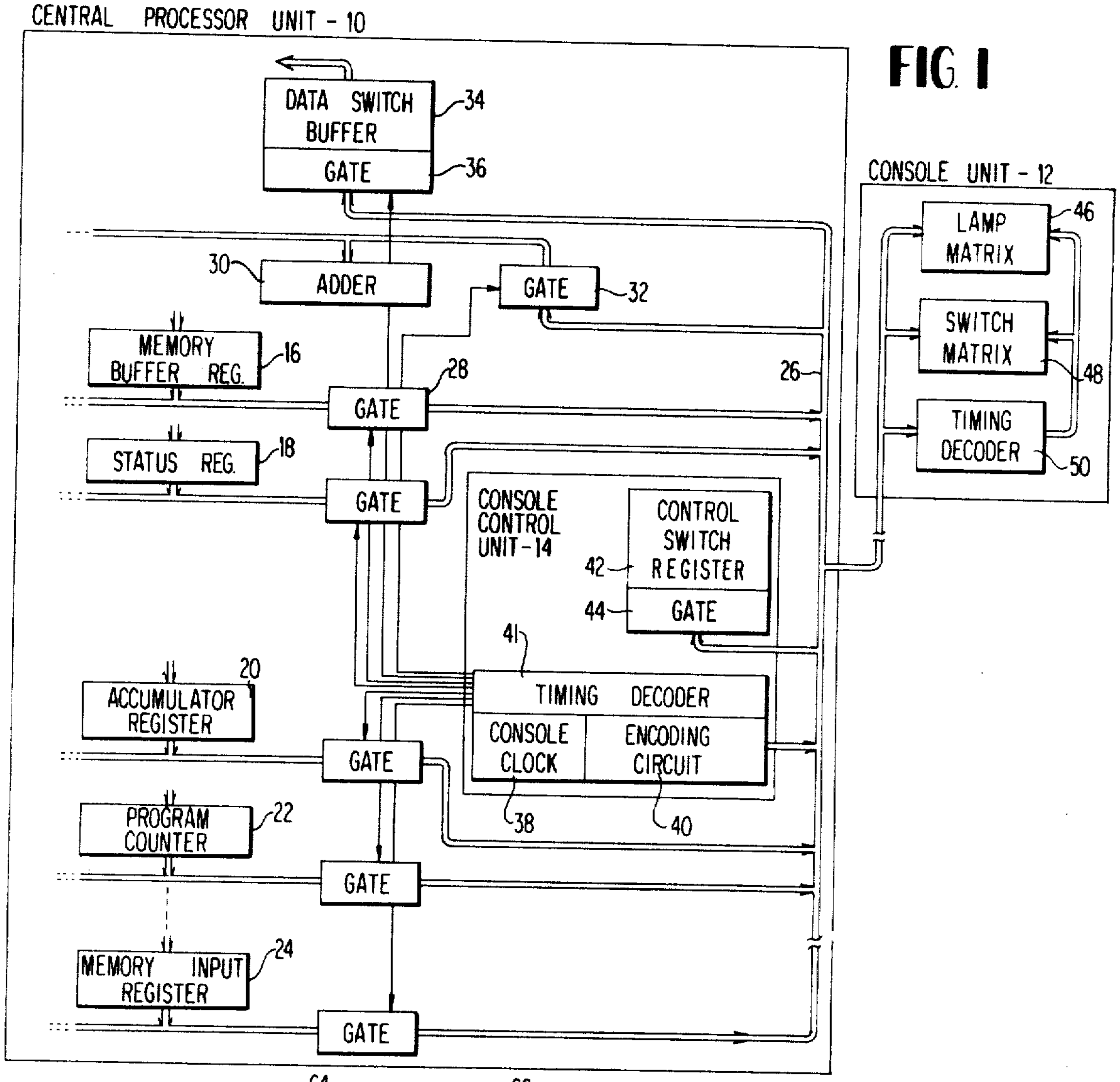
FIG. 1 depicts a data processing system incorporating this invention.

A data processing system incorporating this invention comprises a central processor unit 10 and a console unit 12, shown in FIG. 1. Other units are not shown because they form no part of the present invention. The central processor unit 10 comprises a console control element 14 and a plurality of registers and associated gating circuits. By way of example, the central processor unit comprises a memory buffer register 16, a status register 18 and an accumulator register 20, a program counter 22 and a memory input register 24. Each register is coupled to a bidirectional indicator bus 26 through its associated output gating circuits. For example, a gate 28 couples the contents of the memory buffer register 16 onto the indicator bus 26 when it is enabled. In addition, each register receives signals from or transfers signals to other portions of the central processing unit during normal processing, as known. Details of these connections are not necessary to understand this invention and are not included.

The central processor unit 10 shown in FIG. 1 also comprises an adder 30 and an input gate 32 for transferring information in the form of digital signals from the indicator bus 26 into the adder 30. Signals on the indicator bus 26 can also be transferred into a data switch register 34 through a gate 36.

The console control element 14 in the central processor unit 10 comprises a console clock 38 which drives an encoding circuit 40 to produce individual gating signals in a recurring sequence at the output of a decoder 41. By adding the console clock 38 as a conventional, independent free-running clock, it is possible to transfer signals to or from the console unit 14 without interrupting the normal operation of the data processing system. The console control element 14 also comprises a control switch register 42 which receives signals from the indicator bus 26 when a gate 44 is enabled.

Still referring to FIG. 1, the console unit 12 comprises a display lamp matrix 46, a switch matrix 48, a timing decoder 50 and circuits for responding to various control signals. The timing decoder 50 converts signals from the encoding circuit 40 into gating signals for sequentially selecting single rows in the lamp matrix 46 or the switch matrix 48. As a result, one set of timing signals in the encoding unit 40 can simultaneously energize the gate 28 in the central processor unit 10 and select a row in the indicating lamp matrix 46 for displaying the memory buffer contents. Another pair of gating signals from the two decoders selects a row of switches and energizes an input gate 44 for the control switch buffer 42 to store signals representing the state of each switch in the row.

The bus 26, itself, includes one conductor for each lamp or switch in the largest register or longest row. In addition, there are conductors for power and other signals which are always coupled between the console unit and central processor unit.

Figure 2:
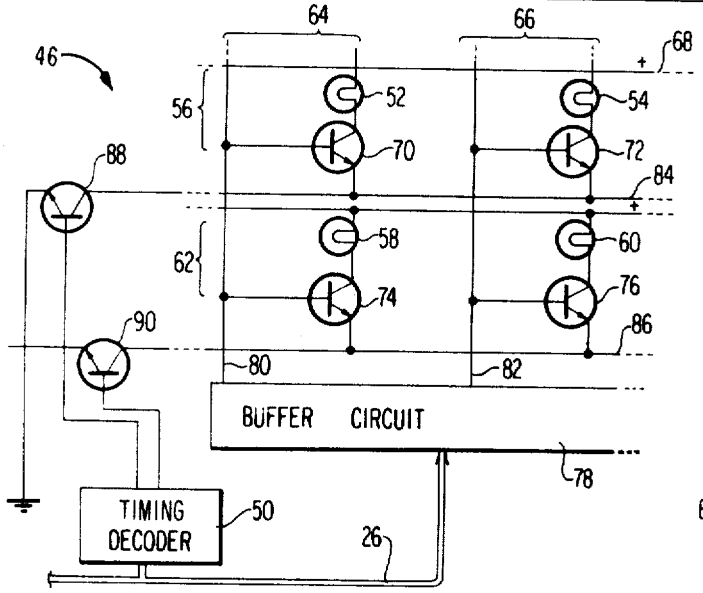
FIG. 2 is a detailed diagram of a display lamp matrix shown in FIG. 1.

FIG. 2 depicts one embodiment of the lamp matrix 46. Lamps 52 and 54 are arranged electrically in one row 56 of the matrix while lamps 58 and 60 are arranged in another row 62. The lamps 52 and 58 form one column 64; lamps 54 and 64, another column 66. Each lamp is connected in series with common positive power supply conductor 68 and a switching transistor, the transistors 70, 72, 74 and 76 in FIG. 2 controlling the energization of lamps 52, 54, 58 and 60, respectively. Each output conductor from a buffer circuit 78 is connected to all base electrodes of switching transistors in a given column. For example, a conductor 80 is coupled to the base electrodes of the transistors 70 and 74 and all other transistors in the column 64. Whenever an assertive signal appears on the conductor 80, it biases all the transistors in the column 64 for conduction. Similarly, an asserted signal on a conductor 82 biases all transistors in column 66, such as transistors 72 and 76, for conduction.

However, the emitter electrode for each switching transistor must be grounded simultaneously with a signal at its base electrode to cause conduction. A grounding conductor 84 couples the emitter electrodes for transistors 70 and 72 and other transistors in the row 56 while a grounding conductor 86 is connected to all emitter electrodes for transistors in the row 62. The grounding conductors 84 and 86 are individually coupled to ground by grounding transistors 88 and 90, respectively, in series with the conductors 84 and 86. Both grounding transistors 88 and 90 are controlled by the output signals from the timing decoder 50.

When the timing decode 50 turns on grounding transistor 88, it enables the transistors 70 and 72 to conduct, so an assertive signal on the conductor 80 turns on the transistor 70 and energizes the lamp 52. If the signal on the conductor 82 at that time is not at an assertive level, the transistor 76 remains nonconductive so the lamp 60 is not illuminated. After a predetermined time period, the timing decoder deenergizes the grounding transistor 88 thereby turning off all lamps in the row 56 which were illuminated and simultaneously energizes the grounding transistor 90. At this time the lamps in the row 62 light in accordance with signals then generated by the buffer circuit 28.

Figure 3:
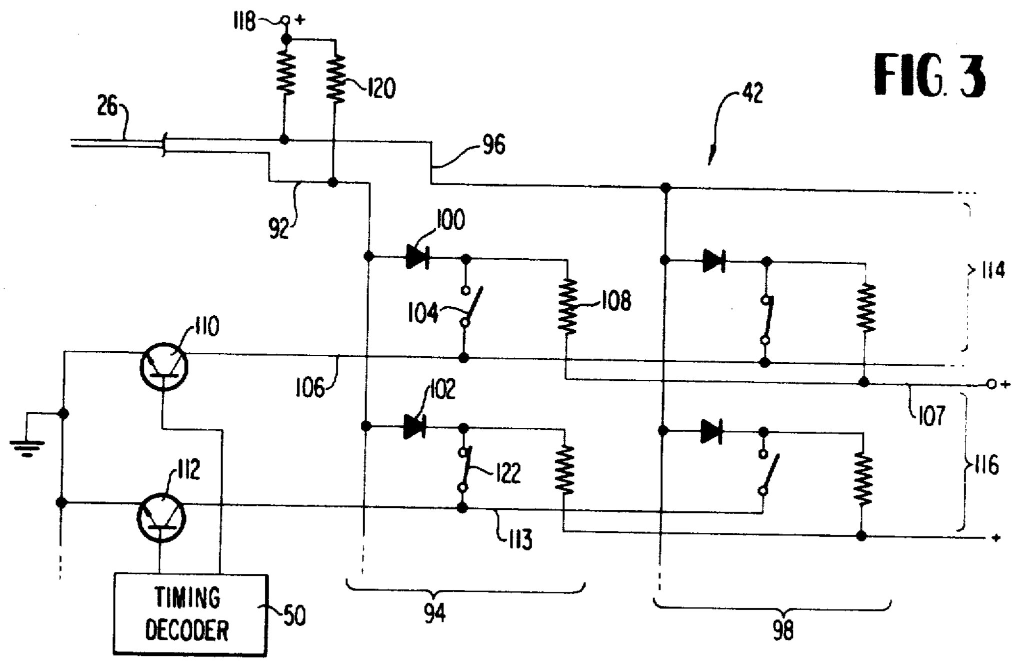
FIG. 3 is a detailed circuit diagram of a switch matrix shown in FIG. 1.

A somewhat similar arrangement is used in the switch matrix 48 shown in FIG. 1 and more specifically in FIG. 3. Each conductor in the indicating bus 26 is coupled to a specific column of switches in the matrix. For example, a conductor 92 in the indicating bus 26 is associated with a column 94, while a conductor 96 is associated with a column 98. The conductor 92 is coupled to the anodes of diodes associated with each switch in the column 94, such as diodes 100 and 102. Diode 100 is either coupled to a grounding conductor 106 by closing a switch 104 or to a positive power supply 107 through a resistor 108. The grounding conductor 106 is coupled through a grounding transistor 110 controlled by the timing decoder 50. Another grounding transistor 112 grounds a conductor 113 when it is energized. All the switches are also arranged in rows so the grounding conductors 106 and 113, when grounded, select the row 114 or a row 116, respectively.

The conductor 92 is maintained at a positive potential by a positive power supply terminal 118 and resistor 120. Therefore, in this embodiment a positive signal in any conductor represents a non-assertive signal. If the switch 104 is open, as shown in FIG. 3, the diode 100 is backbiased so the conductor 92 remains at the non-assertive level when the transistor 110 conducts.

On the other hand, a switch 122 in column 94 and row 116 is shown in its closed position. When the transistor 112 conducts, it grounds the cathode of the diode 102 through the switch 122 so substantially all voltage at the terminal 118 appears across the resistor 120. This substantially grounds the conductor 92 and generates an assertive signal.

Figure 4A:
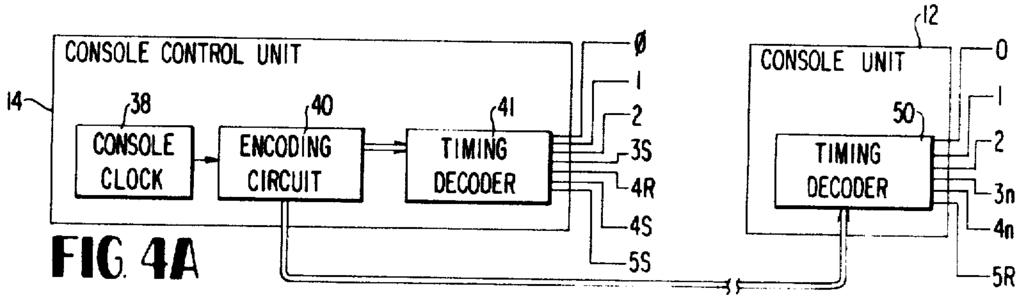
FIG. 4 consisting of FIGS. 4A and 4B is a timing diagram used for understanding this invention.
Figure 4B:
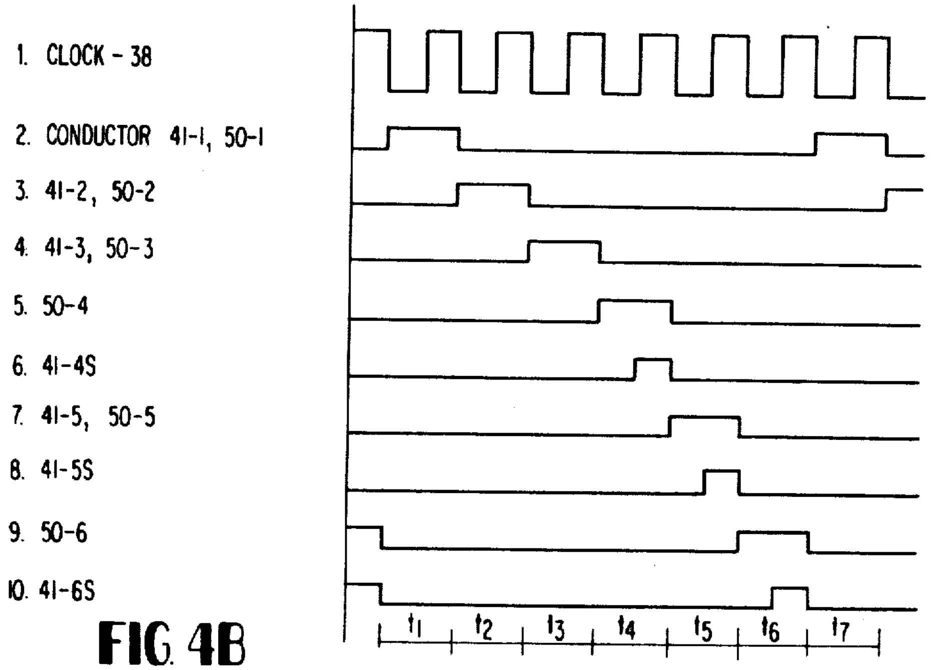

Now referring to FIG. 4, the console unit 14 in FIG. 4A generates a plurality of gating signals which the decoders 41 and 50 transform into the recurring sequence of gating signals. Specifically, the console control unit clock 38 produces pulses shown in FIG. 4B(1). The encoding circuit 40 includes a counter circuit for transforming these pulses in parallel signals which energize both decoders 41 and 50 to produce the various gating signals in a recurring sequence as shown in FIGS. 4B(2) through 4B(10). Specifically, during a first time period, $t_1$, the decoders 41 and 50 produce an assertive signal on output conductors designated as conductors 41–1 and 50–1, respectively. During the next successive time periods $t_2$ through $t_7$, the decoders generate signals on each of the remaining output conductors in sequence. Then the encoding circuit 40 cycles and repeats the sequence. The decoder 41 also produces three strobing pulses on conductors 41–4S, 41–5S and 41–6S. These pulses occur during the second half of each timing cycle for the related gating signal to provide a delay in monitoring switch conditions and thereby avoid transient errors as described later.

Figure 5:
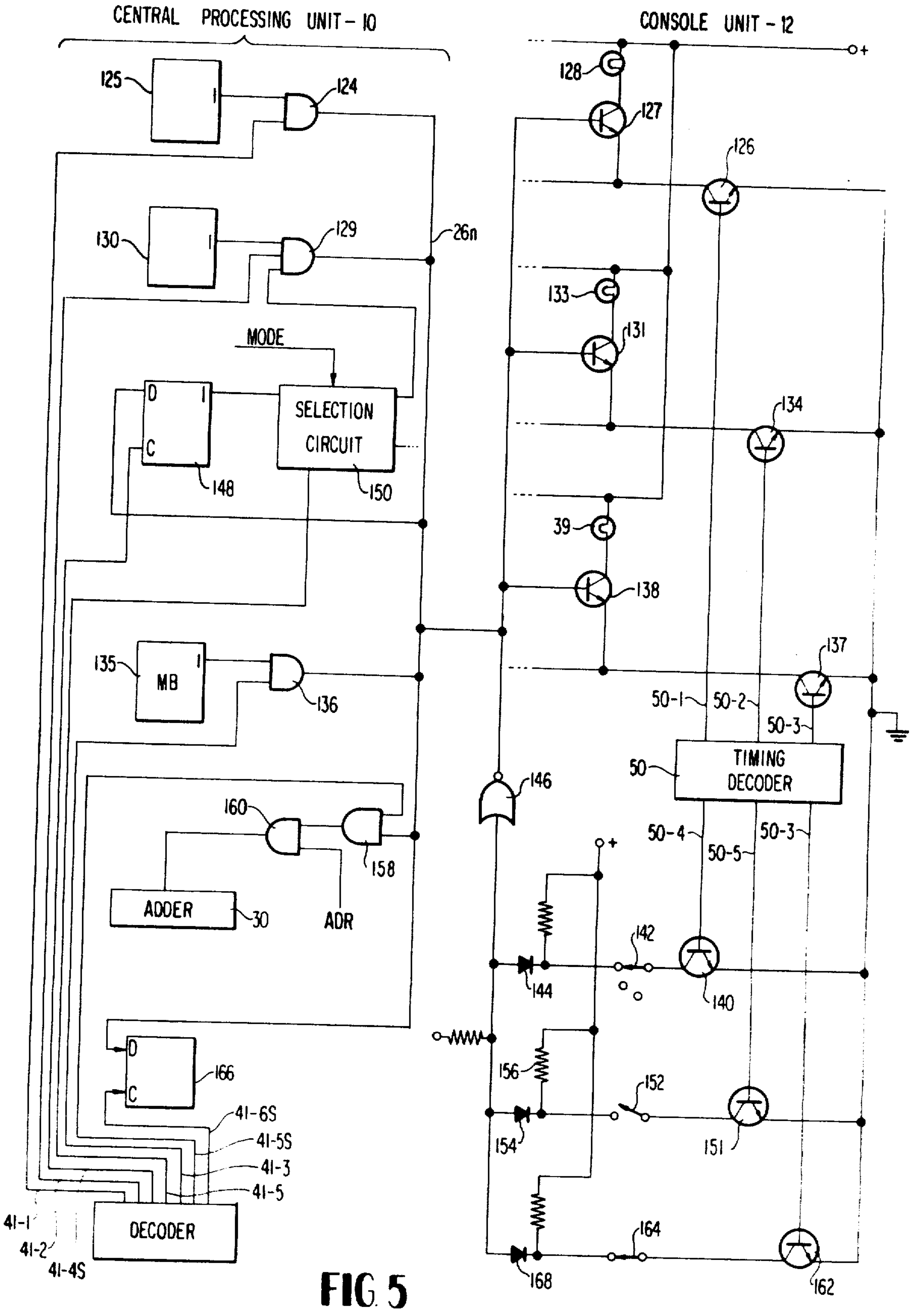
FIG. 5 is a more detailed diagram of the data processing system shown in FIG. 1.

FIG. 5 illustrates portions of the central processor unit 10 and the console unit 12 related to a corresponding stage in a number of registers and other storage locations together with associated indicating lamps and switches. It is most easily understood by describing the transfers in accordance with the timing diagram shown in FIG. 4B.

When the decoders 41 and 50 simultaneously energize the conductors 41–1 and 50–1, they energize a gate 124 associated with a single stage 125 of the condition status register 18 and a grounding transistor 126 associated with a first row of indicating lamps. If the stage 125 stores an assertive signal, that signal biases a transistor 127 into conduction over the conductor 26*n*. As a result, a lamp 128 lights. As only the grounding transistor 126 is biased for conduction, however, other transistors in the indicating lamp column corresponding to the stage 125 cannot conduct because their associated grounding transistors are not conducting. When the time period $t_1$ terminates, the signals on the conductors 41–1 and 50–1 disable the gate 124 and turn off the grounding transistor 126 to deenergize all lamps in the first row.

Simultaneously, the decoders 41 and 50 energize conductors 41–2 and 50–2 to partially enable a gate 129 associated with the output of a stage 130. A second enabling input produced by a register selection circuit described later enables the gate if it exists simultaneously with the signal on the conductor 41–2. Assuming the gate 129 is enabled and the stage 130 stores an assertive signal, the conductor 26*n* biases a transistor 131 into conduction to light an associated lamp 133 because the decoder 50 simultaneously biases a grounding transistor 134 for conduction. If the stage 130 stores a non-assertive signal, the lamp 133 does not light during this period because the conductor 26*n* does not bias the base electrode of the transistor 131 for conduction.

During the time period $t_3$, the timing decoders 41 and 50 transfer a signal from a stage 135 in the memory buffer register 16 (FIG. 1) through a gate 136 to a third row of lamps selected by a grounding transistor 137. This occurs when the conductors 41–3 and 50–3 are energized simultaneously.

If the console unit comprises additional rows of lamps, the circuits in FIGS. 4 and 5 are modified to produce additional gating signals. Where the console unit 12 includes three rows of lamps, the next time period, $t_4$, is reserved for monitoring a first row of switches. Initially, the timing decoder 50 energizes a conductor 50–4 and biases a grounding transistor 140 for conduction to select the first row of switches. If a switch 142 in the column associated with the conductor 26*n* is closed, a diode 144 conducts and an inverter 146 produces an assertive signal on the conductor 26*n*. The inverter 146 in this embodiment converts an assertive signal at a ground potential from the switch 142 and diode 144 to an assertive signal at a positive voltage which is compatible with the remaining circuits shown in FIG. 5.

During the first half of the time period $t_4$, the decoder 41 does not energize its corresponding conductor 4S so no changes occur in a clocked flip-flop 148. When the decoder 41 does energize the conductor 4S, during the second half of the timer period $t_4$, it causes the flip-flop to store the signal in the conductor 26n. If the switch 142 is closed, the signal on the conductor 26n sets the flip-flop 148 on the leading edge of a pulse on the conductor 41–4S. This delay between the leading edges of pulses on conductors 50–4 and 41–4S provides a settling time which minimizes errors caused by transients on the conductor 26n.

Normally, this completes the storage operation. However, in this specific embodiment, the switch 142 is a multiposition selector switch with each contact connected through a diode to a separate conductor in the cable 26 and clocked flip-flops equivalent to the clocked flip-flop 148. Each flip-flop supplies one input to each stage of a selector circuit. FIG. 5 shows a selector circuit 150 for one position. One output signal is the second enabling signal for the gate 129. This signal is generated by the circuit 150 if the signals on the conductors 26n and 41–4S set the flip-flop 148. During the time period $t_5$, the conductor 41–5 from the decoder 41 sets the signal for the gate 129. This signal is not reset or changed until the conductor 41–5 is energized again. If the flip-flop 148 stores an non-assortive signal, the circuit 150 does not produce any selection signal. Rather, some other selector circuit energizes the gates associated with another register.

The number of registers which can be selected by the switch 142 can be doubled by adding another switch in the console unit 12. If this switch is open, another register stage stores the non-assertive signal which is designated as a MODE signal. This signal is applied to the selector circuit 150 and all others to control whether the switch 142, when positioned as shown, enables the gate 129 or an analogous gate for another register. In this way, a given position of the switch 142 selects one of two registers for display in conjunction with a MODE signal and switch. Hence, the number of registers from which a selection is made doubles. Further, it is now apparent that in this embodiment, the selection is made during one sequence while the resulting display is produced during the next sequence.

When the decoder 50 energizes the conductor 50–5, a grounding transistor 151 conducts and selects a row of switches including an address switch 152. If the switch 152 is open as shown in FIG. 5, a diode 154 remains backbiased through a resistor 156 so the signal on the conductor 26n is not asserted. When the decoder 41 produces a pulse on the conductor 41–5S, it enables a gate 158. In this specific embodiment, each address transfers through the adder 30. An ADR signal, generated by the central processor unit 10 in a manner known in the art, enables a second gate 160 in series with the gate 158 to complete the transfer and store the non-assertive signal in one stage of the adder.

If there are three rows of switches, the last gating signals in each sequence are generated on the conductors 50–6 and 41–6S. The gating signal in the conductor 50–6 turns on a grounding transistor 162 to select a third row of switches. If these switches are data switches, the conductor 41–6S stores a signal representing the condition of a switch 164 into a clocked flip-flop 166. As the switch 164 is closed, diode 168 conducts while the timing decoder 50 energizes the conductor 50–6; and the flip-flop 166 stores the resulting assertive signal.

In this embodiment, the three rows of indicating lamps in the lamp matrix provide a persistent display of information in a register comprising stages representing various control conditions, the memory buffer register and a selected register. The three rows of switches generate a signal for the register selection, address information, data and other control information.

As previously indicated, the encoding circuit 40 produces signals which are converted into a recurring sequence of gating signals. The console clock 38 frequency is selected so the encoding circuit 40 produces each signal at a recurring rate which illuminates an energized indicating lamp persistently. This frequency is dependent on the total number of rows in the two matrices 46 and 48. Although each lamp is energized by a pulse so it operates at a reduced duty cycle, the apparent or average light intensity is maintained at a level obtained by energizing the lamp continuously at its rated voltage. This is done by increasing the energizing voltage. No lamp-life degradation seems to occur when voltage increases are coupled with duty cycle decreases. As a result, a number of lamp sets and switch sets in the console can be energized and monitored intermittently over a single bus.

With six rows of indicating lamps and switches, a persistent display requires the clock 38 to generate 36 kHz clocking pulses. At this rate, the signals in the bus 26 light selected lamps in each row for approximately 55 microseconds during each 330 microsecond interval. This is the interval for each sequence and can be obtained when the clock 38 energizes a modulo-6 counter in the sequencing circuit 40. Further, the average light intensity is maintained at this reduced duty cycle by increasing the voltage to about 16 percent of rated voltage for the lamp at a 100 percent duty cycle.

Therefore, in accordance with our invention, we persistently display information on several sets of indicating lamps and monitor the condition of several sets of switches by multiplexing the necessary signals over a single set of conductors. Duplicate conductors in the prior art are eliminated. While we have described this invention in terms of particular gating signal sequences, electrical matrices and other specific circuits, many modifications may be made. For example, we have shown a separate cable and bus connected to all the output gates and input gates in the central processor unit 10. Other transfer arrangements and sequences can be implemented. We have shown one particular embodiment of each switch and lamp matrix, but alternative lamp and switch arrangements are possible. Therefore, it is the object of the appended claims to cover all such variations and modifications as come within the true spirit and scope of this invention.

What we claim is new and desire to secure by Letters Patent of the United States is:

1. A data processing system comprising:

A. a plurality of sets of storage locations,

B. a plurality of indicating lamps and switches,

C. means for electrically connecting said lamps and switches into at least one lamp set and one switch set, D. an interconnecting cable, and E. means periodically connecting each lamp set and switch set and corresponding location sets to said cable in a recurring sequence to thereby transfer signals for each lamp and switch set over the same cable, said connecting means including a timing generator for repeating the sequence at a rate which provides a persistent lamp display.

2. A data processing system as recited in claim 1 wherein said storage locations are located in a central processing unit and said lamp and switch sets are located in a console unit, said interconnecting cable connecting said central processor unit and said console unit.

3. A data processing system as recited in claim 2 wherein said central processor unit additionally includes selection means responsive to certain of said switches coupling a selected one of a plurality of said storage locations to one of said set lamp sets.

4. In a data processing system including a central processor unit with a plurality of storage registers and a console unit with a plurality of indicating means electrically arranged in rows in a matrix, said system comprising:

A. a bus interconnecting said central processor unit and said console unit,

B. a generator for producing a recurring sequence of periodic gating signals,

C. first gating means responsive to first gating signals from said generator for coupling the contents of one storage register onto said bus, and D. second gating means responsive to said first gating signals for coupling one row of indicating means to said bus whereby said indicating means row displays the contents of said one register for the duration of each of said first gating signals.

5. A data processing system as recited in claim 4 wherein said bus comprises a plurality of conductors and wherein said indicating means comprises:

A. a plurality of lamps arranged electrically in rows and columns,

B. first switching means for coupling each lamp between a common power supply and a common grounding conductor, all switching means in one column being responsive to a signal on one conductor in said bus, C. second switching means for grounding all said common grounding conductors in one row, each of said second switching means being responsive to one of said gating signals whereby a lamp in a given column and row is illuminated when its corresponding first and second switching means conduct simultaneously.

6. A data processing system as recited in claim 4, said console unit additionally comprising a plurality of switches arranged in rows in a matrix and third and fourth gating means responsive to second gating signals for coupling signals representing the conditions of one row of switches to one of a plurality of second registers in said central processor unit representing corresponding rows of switches.

7. A data processing system as recited in claim 6 wherein said third gating means comprises third switching means in series with each row of switches for connecting one pole of each switch in said row to a reference potential, a conductor in said bus being energized by the reference potential for applying a signal onto said interconnecting bus when a corresponding switch and said third switching means for that row conducts simultaneously, said central processor unit including input gating means responsive to said second gating signals for transferring signals on said interconnecting bus into corresponding storage registers.

8. A data processing system as recited in claim 7 wherein said second gating signals generated by said timing generator having first and second portions, said third switching means being enabled during the first and second portions, said input gating means being enabled only to the second portion to thereby delay the transfer of data into the registers.

9. A data processing system as recited in claim 7 wherein said generator comprises a free-running clock for generating clock pulses and means responsive to said clock pulses for producing the recurring sequence of timing signals.

10. A data processing system as recited in claim 9 wherein said central processor unit additionally comprises a first decoder responsive to the timing signals for generating selection signals in sequence for enabling said first and input gating means do thereby transfer data to and receive data from said interconnecting bus.

11. A data processing system as recited in claim 10 additionally comprising a second decoder means responsive to the timing signals for sequentially grounding switching means in said second and third gating means to thereby transfer data to and from said console unit in sequence, said signals from said first and second decoders being synchronized so corresponding storage locations and lamp sets and corresponding storage locations and switches are interconnected simultaneously.

* * * * *